A. H. WOLFF.
GAS TOASTER.
APPLICATION FILED JAN. 21, 1919.
1,353,203.
Patented Sept. 21, 1920.
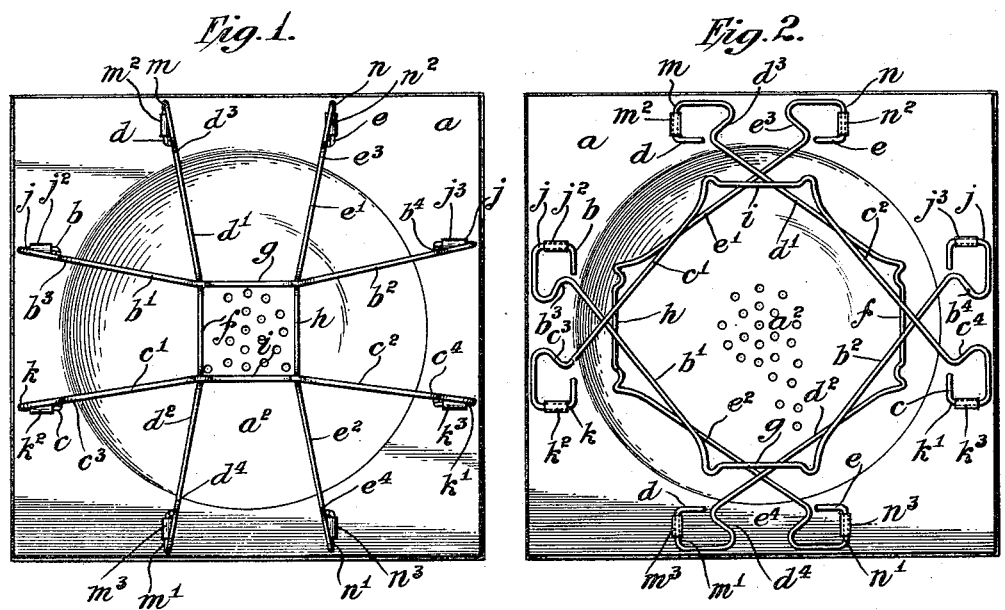
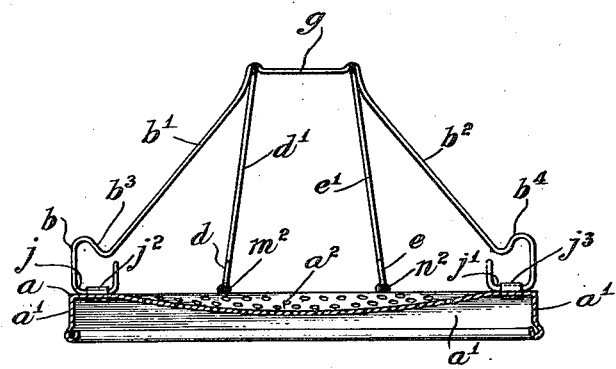

UNITED STATES PATENT OFFICE.

AARON H. WOLFF, OF NEW YORK, N. Y.

GAS-TOASTER.

1,353,203.　　　　Specification of Letters Patent.　　Patented Sept. 21, 1920.

Application filed January 21, 1919. Serial No. 272,239.

*To all whom it may concern:*

Be it known that I, AARON H. WOLFF, a citizen of the United States, residing at the borough of Manhattan, in the city, county, and State of New York, have invented certain new and useful Improvements in Gas-Toasters, of which the following is a specification, reference being had therein to the accompanying drawings, which form a part thereof.

My invention relates to gas toasters, and more particularly to improvements in that type thereof adapted to be mounted directly above the burner jets of a gas stove.

Heretofore in this art, it has been the common practice to produce toasters consisting of a metallic shell in the form of a truncated pyramid having a plurality of openings through the walls thereof and carrying racks for the bread upon the outer walls of this shell. By this construction, portions of the bread were exposed to the direct action of the flame from the gas burner, and a large number of minute openings through which the heat and flame may escape, are afforded. With such a toaster, the bread is irregularly browned, there not only being a tendency to toast it more rapidly adjacent these openings, but also adjacent the top of the toaster, owing to the concentration of heat within the shell at this point. This last named condition necessitates the inversion of the slice of bread during the toasting operation, in order to uniformly brown same, or even approximately so.

A toaster made in accordance with my invention is so constructed that no portion of the bread placed thereon will be subjected to the direct action of the flame from the gas burner, and the entire slice will be subjected to substantially the same heat conditions, so as to be simultaneously and uniformly browned throughout same. I secure this result by confining the flame from the burner within a fairly thin metallic base, which will quickly come to a red heat. In this manner the toasting is effected by means of the radiant heat from the incandescent base, this heat being so distributed or diffused as to act substantially uniformly upon the entire surface of the bread, thus avoiding the necessity for inverting the bread during the toasting thereof. Carried by the base are inclined racks, which, for convenience, are mounted so as to be collapsible thereon when the toaster is not in use.

The base itself is so constructed as to insure a sufficient area thereof coming to a red heat, it being essential that the heated area shall extend to a point close to the perimeter of the base, in order to subject the entire surface of the bread upon the racks to the action of the radiant heat.

The invention consists primarily in a gas toaster embodying therein a metallic base, the top of which has a depressed, concaved central portion adapted to have the flame from a burner impinge directly thereon, and a plurality of converging racks disposed about, and projecting from, the top of said base, whereby bread upon said racks will be inclined with relation to the top of said base; and in such other novel features of construction and combination of parts as are hereinafter set forth and described, and more particularly pointed out in the claims hereto appended.

Referring to the drawings,

Figure 1 is a plan view of a toaster made in accordance with my invention, with the racks raised;

Fig. 2 is a similar view with the racks collapsed upon the base; and

Fig. 3 is a cross-sectional view with the racks raised.

Like letters refer to like parts throughout the several views.

In the embodiment of my invention shown in the drawings, $a$ indicates the base of the toaster, which is preferably ordinary sheet iron having the edges thereof down-turned, as at $a'$ so as to confine the flame and heat within said base. The central portion of the base $a$ is depressed and concaved as shown at $a^2$, the concavity extending to a point adjacent the perimeter of the base. By this construction, when the base is placed upon the burner of a gas stove, the flame will be deflected outwardly of the base, and heat therefrom will be more or less uniformly diffused about the central portion of the base in a manner to quickly bring the entire central portion to a red heat, the metal stock of the base being fairly thin in order to insure rapidity in thus bringing it to the desired temperature. I have, by experiment, determined that it is desirable to provide no large openings in the top of the base $a$ and in some cases to provide numerous small openings in the concaved portion of said top, if it is desired to secure a uniform browning of the entire surface of the bread.

Disposed about, and projecting from, the top of the base $a$, are four converged racks, $b$, $c$, $d$ and $e$, arranged in pairs, the members of each pair being oppositely disposed. Each of said racks is made of formed wire, and is composed of side reaches $b'$—$b^2$, $c'$—$c^2$, $d'$—$d^2$ or $e'$—$e^2$, having, adjacent the opposite ends thereof, stepped portions $b^3$—$b^4$ $c^3$—$c^4$, $d^3$—$d^4$ or $e^3$—$e^4$, forming rests for a slice of bread, and a top reach $f$, $g$, $h$ or $i$, connecting said side reaches. The side reaches of each rack converge toward the top reach thereof, thus securing a more or less pyramidal effect when the racks are in the raised position.

The ends of the various racks are so formed as to permit them to be mounted upon the base $a$ by means of a hinge connection, so that when the toaster is not in use, the racks may be collapsed upon the base and thus permit the toaster to be conveniently stored.

In the embodiment of the invention shown, the ends $j$—$j'$ of the rack $b$ are provided with a right angular bend and are secured to the top of the base $a$ by means of hinge socket clips $j^2$—$j^3$, the top of said base $a$ being pierced to receive said lips. The ends $k$—$k'$ of the rack $c$, $m$—$m'$ of the rack $d$, and $n$—$n'$ of the rack $e$, are similarly formed and secured to the top of the base $a$ by means of the socket clips $k^2$—$k^3$, $m^2$—$m^3$, and $n^2$—$n^3$ respectively.

The top reaches $f$—$h$ are provided with notches or depressions adapted, when the racks are closed, to seat in coöperating notches or depressions in the top reaches $g$—$i$, so as to prevent an accidental collapsing of the rack structure while the toaster is in use, the spring of the top reach and the side reach of each rack being relied upon to insure the desired interlocking and disengaging of said top reaches in raising or lowering the racks.

While I prefer to use socket clips for pivotally mounting the racks in relation to the base $a$, it is of course understood that any other desired manner of mounting these racks upon said base, may be employed, if desired.

When using a toaster made in accordance with my invention, the racks $b$, $c$, $d$ and $e$ are raised, the top reaches $h$ and $f$ being brought beneath the top reaches $g$ and $i$ until the depressions or notches in said reaches respectively engage or interlock in a manner to hold said racks in the raised position. Said racks being of substantially the same height, this engagement will result in the metal of said top reaches springing slightly to permit such interlocking.

When the racks are thus raised, slices of bread may be laid upon the rests of all of said racks, by which they will be supported at an incline to the top face of the base $a$, leaving, between the side edges of adjacent slices of bread, and below said rests, space through which air may flow, the open space at the top of the racks affording a reduced outlet for the heated air.

When the toaster is placed upon the gas burner, the flame impinging upon the concaved portion thereof, will be deflected, or spread, thereby, so as to act upon substantially the entire area of this concaved portion, the sides $a'$ of said base confining said flame, and the heat, within the base. As a result, the entire central portion of said base will rapidly be brought to a red heat, the radiant heat from which, will act upon the entire surface of the bread presented to it, thus rapidly and evenly toasting the bread. Since the portion of the top of the base, which is brought to a red heat, extends in close juxtaposition to the rests upon the various racks, the lower portion of the slice of bread will be quickly toasted, the upper portion thereof being, however, toasted quite as rapidly, since the temperature of the top of the base $a$ toward the center thereof, will be somewhat higher than toward the edges of the portion $a^2$, which increase of temperature will compensate for the increased distance of the upper portion of the slice of bread from said top plate. The inclination or convergence of the racks, will cause the heat to act directly on the entire surface of the bread, the circulation of air within the racks and the bread thereon, aiding diffusion of the radiant heat in a manner to effect the desired toasting action.

If openings be formed in the concaved or dished portion $a^2$, it will not only interfere with the proper heating of this portion, but will have a tendency to burn the bread in spots, the main purpose of my invention being to concentrate the heat from the burner within the various racks and heat the top of the base within this area to a red heat, so as to effect the toasting of the bread by means of the heat radiated from the top of the base, the concavity of this top being essential to insure the diffusion or distribution of the heat in a manner to cause it to act substantially uniformly upon the slices of bread upon the racks.

It is not my intention to limit the invention to the precise details of construction shown in the accompanying drawings, it being apparent that such may be varied without departing from the spirit and scope of the invention.

Having described the invention, what I claim as new and desire to have protected by Letters Patent, is:—

1. A gas toaster embodying therein a metallic base, the top of which has a depressed, concaved central portion adapted to have the flame from a burner impinge directly thereon, and a plurality of converging racks disposed about, and projecting from, the top of said base, whereby bread upon said racks will be inclined with relation to the top of said base, the space within the tops of said racks being free from obstruction, whereby a more uniform application of heat throughout the entire surface of said bread, is facilitated.

2. A gas toaster embodying therein a metallic base, the top of which has a depressed concaved central portion against which the flame from a burner is adapted to impinge and the edge of which is downturned, whereby the flame and heat are confined beneath said top plate, and a plurality of converging open racks disposed about said concaved portion and projecting upwardly from said base, whereby bread upon said racks will be inclined with relation to the top of said base, the space within the tops of said racks being free from obstruction, whereby a more uniform application of heat throughout the entire surface of said bread, is facilitated.

3. A gas toaster embodying therein a metallic base having a perforate top having a depressed, concaved central portion adapted to have the flame from a burner impinge directly thereon and the edge of which is downturned, whereby the flame and heat are confined beneath said top plate, and a plurality of converging open racks disposed about, and projecting from, the top of said base, whereby bread upon said racks will be inclined with relation to the top of said base, the space within the tops of said racks being free from obstruction, whereby a more uniform application of heat throughout the entire surface of said bread, is facilitated.

4. A gas toaster embodying therein a metallic base having a perforate top provided with a central depressed concaved portion adapted to have the flame from a burner impinge directly thereon and the edge of which is downturned, whereby the flame and heat are confined beneath said top plate, and a plurality of converging racks disposed about said concaved portion and projecting upwardly from said base, the tops thereof being spaced apart to afford a reduced outlet for the heated air, and the bottom thereof being spaced away from said base, whereby bread upon said racks will be inclined with relation to the top of said base, the space within the tops of said racks being free from obstruction, whereby a more uniform application of heat throughout the entire surface of said bread, is facilitated.

5. A gas toaster embodying therein a metallic base, the top of which is adapted to have the flame from a burner impinge directly thereon, and a plurality of converging racks disposed about, and projecting from, the top of said base, whereby bread upon said racks will be inclined with relation to the top of said base, the space within the tops of said racks being free from obstruction, whereby a more uniform application of heat throughout the entire surface of said bread, is facilitated, each of said racks comprising a formed wire having the opposite ends thereof hinged to said base, and offset portions forming rests adjacent said end portions respectively, the tops thereof being spaced apart to afford a reduced outlet for the heated air, and said offset portion being spaced above said base.

6. A gas toaster embodying therein a metallic base, the top of which has a depressed concaved portion adapted to have the flame from a burner impinge directly thereon and the edge of which is downturned, whereby the flame and heat are confined beneath said top plate, and a plurality of converging racks disposed about, and projecting from, the top of said base, whereby bread upon said racks will be inclined with relation to the top of said base, the space within the tops of said racks being free from obstruction, whereby a more uniform application of heat throughout the entire surface of said bread, is facilitated, each of said racks comprising a formed wire having the opposite ends pivotally connected upon opposite sides of said base, converging side reaches having an offset portion forming a rest adjacent each end thereof, and a top reach, said racks being arranged in pairs, and the top reach of the racks of one pair having notches or recesses therein adapted to engage coöperating notches or recesses in the top reach of the other pair.

In witness whereof I have hereunto affixed my signature, this 18th day of January, 1919, in the presence of two subscribing witnesses.

AARON H. WOLFF.

Witnesses:
 CLARICE FRANCK,
 F. T. WENTWORTH.